Patented May 30, 1933

1,911,729

UNITED STATES PATENT OFFICE

EDUARD TSCHUNKUR AND WALTER BOCK, OF COLOGNE-MULHEIM, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

TIRE COMPOSITION

No Drawing. Application filed February 7, 1930, Serial No. 426,762, and in Germany February 12, 1929.

The present invention relates to high grade tires for vehicles comprising vulcanization products derived from mixed polymerizates obtained by polymerizing a mixture of a dimethylbutadiene with butadiene or isoprene by heating or while in emulsion with water and an emulsifying agent.

The properties of artificial rubber-like masses not only depend on the polymerization process used, but the hydrocarbon from which the polymerizate is derived plays a decisive part. As it is known the rubber-like masses produced from a dimethylbutadiene possess high strength and plasticity, but only very low elasticity. Moreover, these products exhibit only low stability to cold, becoming hard and brittle at low temperatures (below 0° C.). Conversely, the butadiene and isoprene polymerization products (with the exception of the polymerization products obtained with the aid of sodium metal, which polymerizates possess a different chemical constitution) have indeed a high elasticity and stability to cold, but only low strength and plasticity with the result that their durability and the properties of being worked are for this reason unsatisfactory. The manufacture of high quality tires for vehicles thus encounters, in general, difficulties in the case of both dimethylbutadiene- and also butadiene- or isoprene-polymerization products.

In accordance with the present invention the said disadvantages are absent from the rubber-like masses produced by the polymerization of mixtures of a dimethylbutadiene, such as 2.3- or 1.3-dimethylbutadiene with butadiene or isoprene or butadiene and isoprene, under such conditions that polymerization is performed either by heating the mixture of the hydrocarbons or by polymerizing the mixture while in emulsion with water and an emulsifying agent, which latter process likewise is suitably performed while heating the emulsion, for example, to about 60–90° C. These mixed rubber-like masses display the high strength and plasticity of the dimethylbutadiene rubber as well as the high elasticity of the butadiene or isoprene rubber; they remain elastic and pliable even at a low temperature and possess stability to cold to a far-reaching extent. The mixed polymerizates obtainable as described above therefore are suitable for the manufacture of especially high quality tires for vehicles after working up and vulcanization with highly dispersed fillers (for example, carbon black, zinc oxide and the like). Other ingredients known to favorably influence the polymerization processes above mentioned, such as electrolytes, oxygen, substances yielding oxygen and the like, may be added to the polymerization mixtures before or during polymerization.

Obviously the properties of the mixed polymerizates thus obtainable, and simultaneously those of the tires manufactured with the aid of these polymerizates vary in wide limits, mainly depending on the quantities of the single hydrocarbons applied in the polymerization process, and to some degree, on the more specific details of the polymerization and vulcanization processes applied. Generally the best results regarding the properties of the tires to be manufactured will be obtainable when working in such a manner that the mixed polymerizates contain about 30–60% of dimethylbutadiene polymerizate, but likewise somewhat higher or lower contents of dimethylbutadiene polymerizate (say between about 10–70%) will yield good results.

The manufacture of tires from the mixed polymerizates mentioned above may be carried out according to any desired method heretofore applied for the manufacture of tires from artificial rubber-like masses. For example, a vulcanization mixture is prepared from the mixed polymerizate by incorporating therewith by rolling or kneading carbon black (advantageously in an amount between 20–70% by weight of the mixed polymerizate), zinc white, other filling materials, a vulcanization accelerator, sulfur, selenium or another vulcanizing agent, and the like. From the vulcanization mixture the tire profile is manufactured according to any known method, for example, by pressing calendering, spraying, whereupon the profile is combined with a carcass in the customary manner, pressed into a mold and vulcanized.

The following example will illustrate our invention without restricting it thereto.

*Example*

Into 100 parts by weight of an artificial rubber-like mass obtained by polymerizing a mixture of 50 parts by weight of butadiene-(1.3) and 50 parts by weight of 2.3-dimethyl-butadiene-(1.3) while in emulsion with water and an emulsifying agent, sodium stearate, for example, 50 parts by weight of carbon black, 15 parts by weight of zinc white, 2 parts by weight of stearic acid, 4 parts by weight of tar, 1 part by weight of sulfur, and 0.8 part by weight of the decahydroquinaldyl salt of decahydroquinaldine-dithiocarbamic acid are rolled in. From the vulcanization mixture thus obtained a tire profile is manufactured by pressing, calendering or spraying whereupon the profile is combined with a carcass in the customary manner pressed into a mold and vulcanized by heating to about 140° C. for about one hour. A high grade tire is thus obtained.

We claim:—

1. Composition of matter comprising 20–70% by weight of carbon black and a mixed polymerizate which has been obtained by polymerizing a mixture of a dimethylbutadiene and a compound of the formula

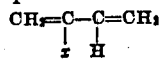

wherein $x$ means hydrogen or methyl, polymerization having been performed by heating the mixture of the starting materials or by polymerizing it while in emulsion with water and an emulsifying agent said composition being adapted to be substituted for rubber in the manufacture of tires for vehicles.

2. Composition of matter comprising 20–70% by weight of carbon black and a mixed polymerizate containing between 30–60% of 2.3-dimethylbutadiene-(1.3) polymerizate, which mixed polymerizate has been obtained by polymerizing a mixture of a 2.3-dimethyl-butadiene-(1.3) and a compound of the formula

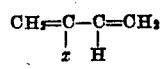

wherein $x$ means hydrogen or methyl, polymerization having been performed by heating the mixture of the starting materials or by polymerizing it while in emulsion with water and an emulsifying agent said composition being adapted to be substituted for rubber in the manufacture of tires for vehicles.

In testimony whereof, we affix our signatures.

EDUARD TSCHUNKUR.
WALTER BOCK.